United States Patent [19]

Rider et al.

[11] 4,079,458
[45] Mar. 14, 1978

[54] HIGH RESOLUTION CHARACTER GENERATOR

[75] Inventors: Ronald E. Rider, Menlo Park; Butler W. Lampson, Portola Valley, both of Calif.

[73] Assignee: Xerox Corporation, Stamford, Conn.

[21] Appl. No.: 713,545

[22] Filed: Aug. 11, 1976

[51] Int. Cl.² .................................................. G06F 3/14
[52] U.S. Cl. ............................. 364/900; 340/324 AD
[58] Field of Search ............. 340/324 AD (U.S. only)

[56] References Cited

U.S. PATENT DOCUMENTS

| | | | |
|---|---|---|---|
| 3,581,290 | 5/1971 | Sugarman | 340/324 AD |
| 3,701,988 | 10/1972 | Allaart | 340/900 |
| 3,729,730 | 4/1973 | Sevilla et al. | 340/324 AD |
| 3,768,093 | 10/1973 | Day | 340/324 A |
| 3,893,075 | 7/1975 | Orban et al. | 340/172.5 |
| 3,898,627 | 8/1975 | Hooker et al. | 364/200 |
| 4,000,486 | 12/1976 | Schomburg | 340/172.5 |
| 4,012,735 | 3/1977 | Keane | 340/324 AD |

Primary Examiner—Gareth D. Shaw
Assistant Examiner—Thomas M. Heckler
Attorney, Agent, or Firm—M. J. Colitz, Jr.; T. J. Anderson; B. P. Smith

[57] ABSTRACT

High resolution character generator for producing rows of characters to be scanned on a display medium. Input data defining characters to be printed in ordered rows of text is sorted to provide specifications for the characters which being on each successive scan line. These specifications are stored initially in an input buffer, and specifications for characters which have been partially printed in a previous scan line are stored in an active character buffer. For each scan line, the character specifications are read first from the active character buffer and then from the input buffer until an end of line specifier is reached. For each character specification received, a font memory containing data defining the characters is cycled. The data from the font memory is decoded and presented to the display medium on a line by line basis.

16 Claims, 10 Drawing Figures

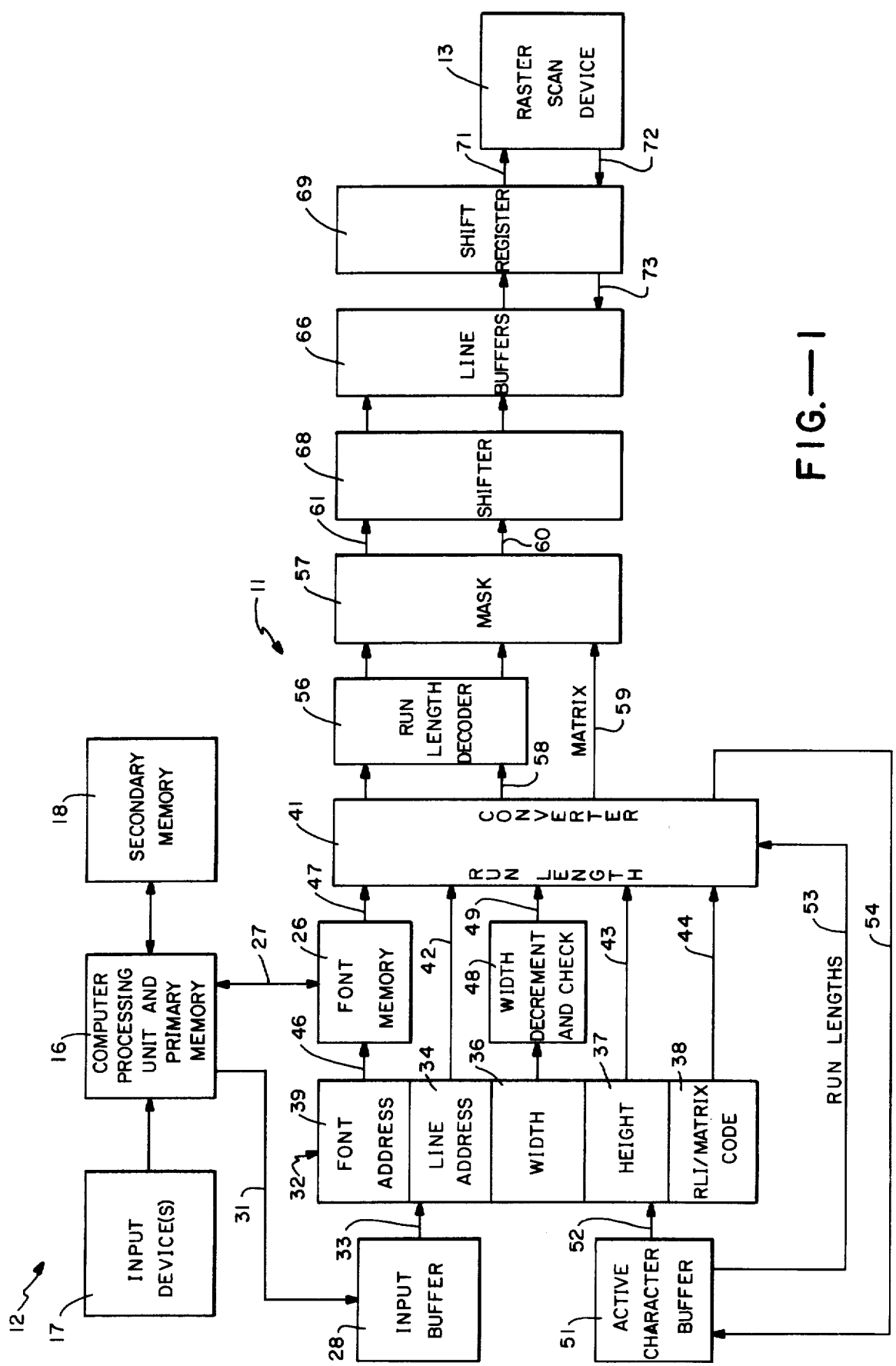
FIG.—1

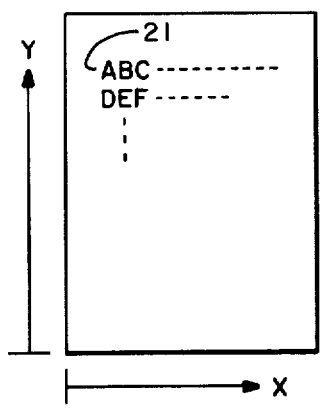
FIG.—2
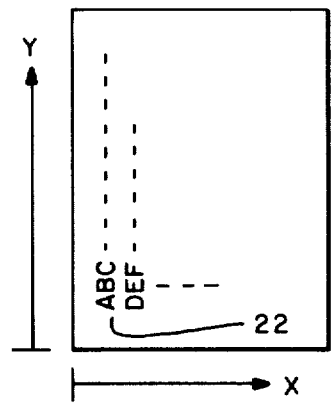
FIG.—3
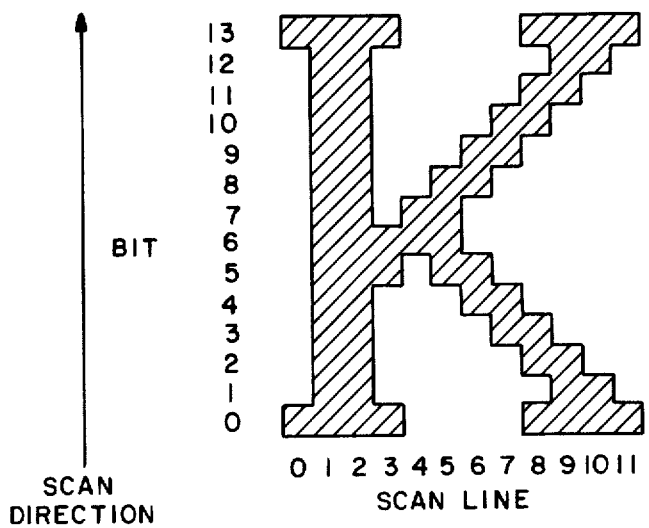
FIG.—4
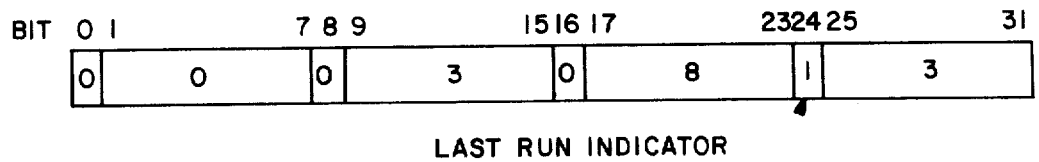
FIG.—5
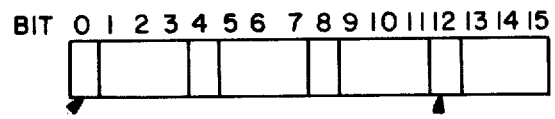
FIG.—6

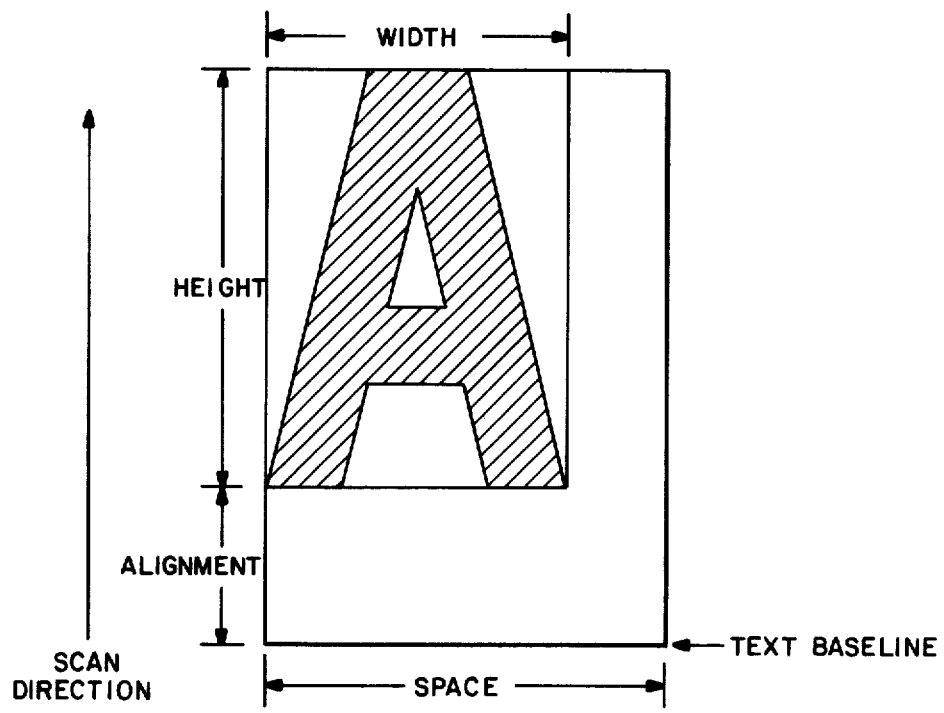
FIG.—7
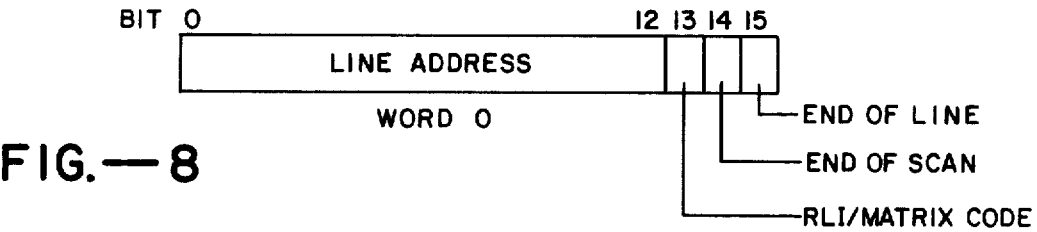
FIG.—8
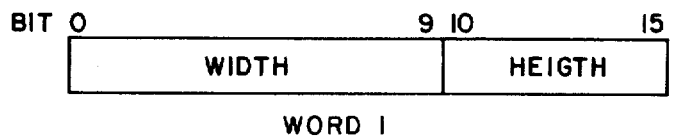
FIG.—9
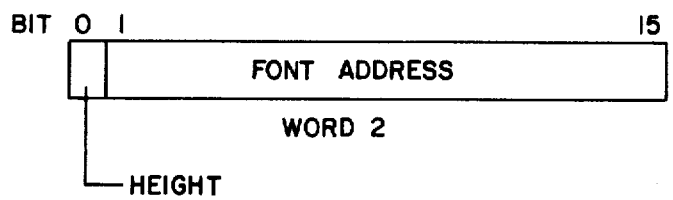
FIG.—10

HIGH RESOLUTION CHARACTER GENERATOR

BACKGROUND OF THE INVENTION

This invention pertains generally to printers and display devices in which images are formed by scanning a display medium in raster fashion, and more particularly to a high resolution character generator for generating alpha-numeric and other characters for display in such systems.

Raster scan devices such as cathode ray tubes have been utilized for a number of years to display alpha-numeric characters and other images in a variety of applications including computer output displays. In such systems, a character generator produces electrical signals which modulate the intensity of an electron beam which scans a display screen to form the desired images.

In recent years, there have been attempts to combine character generators with xerographic engines to provide high speed printers for generating original text or other images. In such devices, a latent charge image is formed on the surface of the copy drum or other electrophotographic imaging member of the xerographic engine by scanning the surface with a laser beam or other suitable light beam modulated in intensity by the output signals of the character generator. The charge image is developed and transferred to form a hard copy by techniques similar to those employed in conventional xerographic copy machines.

Character generator driven xerographic printers heretofore provided have been subject to certain limitations and disadvantages. The number of different characters and fonts which can be printed is limited by the memory space required to store them, and some printers can print only a small number of test lines in a fixed format. When the text lines and scan lines extend in different directions on the page, the problem of aligning characters in different text lines limits some printers to characters of a single size or font pitch.

SUMMARY AND OBJECTS OF THE INVENTION

The invention provides a high resolution character generator which is particularly suitable for use in a xerographic printing system. Input data defining the characters to be printed in ordered rows of text is sorted to provide character specifications ordered by the scan lines in which the characters begin. Specifications for the characters which begin on each successive scan line are stored in an input buffer, and the specifications for characters which have been partly printed in a previous scan line are stored in an active character buffer. Image defining data for a plurality of characters is stored at individually addressable locations in a font memory, and this data is addressed in response to the character specifications in the input buffer and the active character buffer during successive scan lines. The data from the font memory is transferred to an output buffer for processing and presentation to the xerographic printer or other raster scan output device.

It is in general an object of the invention to provide a new and improved character generator for use with a raster scan image forming system.

Another object of the invention is to provide a character generator of the above character which is particularly suitable for use with a xerographic printer.

Another object of the invention is to provide a character generator of the above character which has a high resolution and a capability of producing characters in a variety of sizes, fonts and spacings.

Additional objects and features of the invention will be apparent from the following description in which the preferred embodiment is set forth in detail in conjunction with the accompanying drawings.

BRIEF DESCRIPTION OF THE DRAWINGS

FIG. 1 is a block and data flow diagram of one embodiment of a character generator incorporating the invention.

FIGS. 2 and 3 are illustrations of pages printed in two different formats utilizing the invention.

FIG. 4 is an illustration of a letter K digitized for processing by the invention.

FIGS. 5 and 6 illustrate the encoding of character defining data in a run length incremental format for storage in the font memory of the character generator of the invention.

FIG. 7 illustrates the relationship among the parameters utilized in defining a character in the character generator of the invention.

FIGS. 8–10 illustrate the organization of input data specifications for the character generator of the invention.

DESCRIPTION OF THE PREFERRED EMBODIMENT

As illustrated in FIG. 1, the character generator 11 is interfaced with a computer 12 and a raster scan output device 13. As discussed more fully hereinafter, the computer serves to execute a real time sort of a text-line-oriented character display list into a scan-line-oriented display list. Briefly, this sort is performed as follows. Initially, all characters which begin on the first scan line are selected, and a specification for each of these characters is output to the character generator, followed by an end-of-scan specifier. Similar character specifications are sent to the character generator for the characters which begin on each successive scan line. If no character starts on a given line, only an end-of-line specifier is sent. When all of the text has been sorted and sent, an end-of-page specifier is sent.

The computer can be of any suitable known type, preferably one which can be dedicated to the character generator. Suitable computers include general purpose digital computers, special purpose digital computers, and microprocessors. As illustrated, the computer includes a processing unit 16, an input device 17 and a memory 18. The text-line-oriented character display list data is read into the system through the input device, which can be of any suitable form such as a card reader, a tape reader, a keyboard operated terminal or a combination of such devices. Memory 18 provides means for storing a desired amount of input data, e.g. 1,000 pages, and can be any suitable known type, for example, a magnetic disk, a magnetic drum or a magnetic tape.

In the preferred embodiment, raster scan device 13 comprises a xerographic printer in which a modulated laser beam repeatedly traverses a rotating electrophotographic copy drum in an axial direction. The output of the character generator controls the modulation of the laser beam in a known manner, whereby latent charge images of the characters produced by the generator are formed on the surfaces of the drum. These images are developed and transferred by known techniques to form a printed page.

The system is suitable for printing pages having either a portrait format, as illustrated in FIG. 2, or a landscape format, as illustrated in FIG. 3. In either format, the paper is fed in an edgewise manner, and the scan lines extend in the Y direction along the long dimension of the page. Successive scans are progressively displaced in the X direction along the short dimension of the page, whereby the entire page is scanned in a raster fashion. In the portrait format, the text lines 21, or rows of characters, extend in the X direction along the short dimension of the page, perpendicular to the scan lines. In the landscape format, the text lines 22, or rows of characters, extend in the Y direction along the long dimension of the page, parallel to the scan lines. In either format, the number of scan lines required to display a character is referred to as the width or X dimension of the character, and the number of dots per scan line is referred to as the height or Y dimension of the character. In one presently preferred embodiment, the character generator is suitable for displaying a maximum of 8192 video points in the Y direction, with 4250 scan lines per page and up to 512 characters per scan line.

Referring again to FIG. 1, character generator 11 includes a font memory 26 in which data defining the characters which can be produced by the generator is stored. The data is preloaded into the font memory by any suitable means such as a data bus 27 connecting the font memory directly to the computer. The data for each character is divided into a plurality of individually addressable words or bit sequences corresponding to the portions of the character formed by successive scans. In one presently preferred embodiment, the font memory is arranged in 32-bit words, each containing four 8-bit bytes, addressable at 8-bit boundaries. This memory can readily be incremented to provide a desired storage capacity, e.g., 1024 characters.

The data for individual characters can be stored in font memory 26 in any desired format. In the preferred embodiment, two formats are utilized: matrix format and run length incremental (RLI) format. In the matrix format, one bit is stored for each dot or display element of the character. The incremental format is a compression technique which reduces the font storage required for high resolution characters. For characters in a 10-point font, for example, the incremental format has been found to give a compression on the order of 3.5:1.

Matrix and run length incremental formatting can best be understood with reference to FIG. 4, which illustrates a low resolution letter K digitized in a 12 × 14 bit rectangle. In matrix format, one bit is stored for each dot or element of the character, and for the illustrated letter K, 14 bits would be stored for each scan line. For scan line 0, the stored bits would be 1 0 0 0 0 0 0 0 0 0 0 0 0 1 where a 1 represents a black dot and a 0 represents a white dot.

In run length incremental encoding, the lengths of successive runs of black and white dots are stored, rather than storing a separate bit for each dot. The runs are arranged in pairs, with the first number in each pair representing the number of white dots in a run and the second number representing the number of black dots in the next run. When equal numbers of runs appear in two successive scan lines, only the incremental changes within the runs are stored. The letter K of FIG. 4 is encoded for storage in the incremental (RLI) format as follows:

| Scan Line | Runs | | RLI |
|---|---|---|---|
| 0 | 0,1,12,1 | (R) | 0,1,12,1 |
| 1 | 0,14 | (R) | 0,14 |
| 2 | 0,14 | (I) | 0,0 |
| 3 | 0,1,4,2,6,1 | (R) | 0,1,4,2,6,1 |
| 4 | 6,2 | (R) | 6,2 |
| 5 | 5,4 | (I) | −1,2 |
| 6 | 4,2,2,2 | (R) | 4,2,2,2 |
| 7 | 3,2,4,2 | (I) | −1,0,2,0 |
| 8 | 0,1,1,2,6,2,1,1 | (R) | 0,1,1,2,6,2,1,1 |
| 9 | 0,3,8,3 | (R) | 0,3,8,3 |
| 10 | 0,2,10,2 | (I) | 0,−1,2,−1 |
| 11 | 0,1,12,1 | (I) | 0,−1,2,−1 |

In the preferred embodiment, the incremental format is implemented as follows: the character code, or data which defines the character, starts in the font memory at the location specified by the font address for the character. Runs appear in 8-bit bytes where the first bit of a byte is a flag specifying the last run for a scan line. Thus, for example, scan line 9 of the K would require 32 bits, as illustrated in FIG. 5. Each run may take on a value in the range 0–127, and if a longer run is required, two runs can be spliced together with a zero length connector. For example, 200 white dots followed by 10 black dots can be encoded 100, 0, 100, 10. A limit of eight runs is imposed for each scan line. If a character exists (e.g. some Japanese characters) that requires more than eight runs, it can be stored in matrix format.

The increments for the incremental format are sepecified in 4-bit groups where the first bit is a flag and the remaining three bits are a 2's complement increment in the range −4 to 3. Since the runs always come in pairs, the first bit of a group of runs is never set, and this bit is available to be used to indicate incremental coding. The flag bit that specifies the last increment for a scan line always appears in the second increment of a pair. Therefore, scan line 10 for the letter K would be coded as shown in FIG. 6.

The RLI format is most efficient for large characters and characters of high resolution. For small characters and characters with more than eight runs per scan line, the matrix format is used. In the matrix mode, the character bit pattern is copied directly into the font memory, and a matrix code flag is set. Since the storage required per scan line is not implicit in this definition, the height, or number of bytes per scan line, is included in the specification for the character.

Referring once again to FIG. 1, the character generator also includes an input buffer 28. The character specifications from the computer are delivered initially to the input buffer on data bus 31. In addition to providing initial storage for the character specifications, the input buffer serves to decouple the computer from the bit rate of the character generator and the scan rate of the output device. The input buffer is organized so that the data stored therein is accessed on a first in-first out basis. The data for each character specification is stored in contiguous locations, with the last addressable location in the buffer being considered contiguous to the first addressable location. The size of the buffer is dependent upon the size of the character specification and the number of characters which can appear on a given scan line. For example, with 48 bits per specification and up to 512 characters per scan line, the input buffer should be of sufficient size to store 512 48-bit character specifications.

As discussed more fully hereinafter, the specification for each character includes a line address which defines the position of the character in the scan line, a width parameter which defines the number of scan lines passing through the character, a height parameter which defines the number of bits or dots occupied by the character in each scan line, an RLI/matrix code which defines the format in which the character is stored in the font memory, and a font address which defines the location of the character in the font memory. When accessed, each character specification is read from the input buffer into a multiplexer 32 over a data bus 33. The multiplexer contains a line address register 34, a width register 36, a height register 37, an RLI/matrix code register 38 and a font address register 39, to which the bit containing the respective information are directed.

The line address, height and RLI/matrix code data is delivered from the multiplexer to a run length converter 41 over data lines 42–44, respectively. The font address is applied to font memory 26 by address lines 46, and the addressed character data is delivered from the font memory to the run length converter on lines 47. The width data is applied to a decrementing and checking stage 48 which serves to decrement the width parameter by one count for each scan line on which the character appears until the character is fully displayed. Completion of the character is detected by a zero detector in stage 48. The output of this stage is connected to the run length converter by lines 49.

An active character buffer 51 is provided for storing information for characters which begin on previous scan lines and require additional scan lines to complete. The information stored for such characters includes all of the elements of a new character specification, with the width parameter decremented by stage 48 to indicate the number of scans required to complete the character and the font address incremented to point to the data defining the portion of the character to be displayed in the next scan line. In addition, the information stored in the active character buffer includes the run lengths for the previous scan in the case of characters stored in the RLI format. Character specifications are transferred from the active character buffer to multiplexer 32 over data lines 52, and the run length information is transferred to run length converter 41 over data lines 53. The character specifications and run length information are returned to buffer 51 over data lines 54.

Like input buffer 28, buffer 51 is organized as a first in-first out memory, with the data for each character being stored in contiguous locations. The data for each character is fetched sequentially, and if the data is returned to the buffer, it is placed next to the last specification stored regardless of its former location. Load and fetch cycles are alternated so that one load cycle and one fetch cycle are executed for each cycle of the font memory. The size of buffer 51 is dependent upon the size of the character specifications, the number of bits required to define the run lengths, and the number of characters which can appear in any given scan line. With character specifications and run lengths of the size described heretofore and up to 512 active characters per line, a buffer having a capacity of 512 entries of 108 bits each is suitable.

Run length converter 41 serves to convert run length increment data from font memory 26 to run length data for characters stored in RLI format. This conversion is effected by adding the incremental data to the run length data stored in the active character buffer for the previous line of the character. From converter 41, the run length data passes to a two stage run length decoder 56, 57 on lines 58. A particularly suitable decoder for this purpose is described in co-pending application Ser. No. 713,544, filed of even date. With characters stored in matrix format, the data from the font memory passes through the run length converter unchanged and by-passes the first stage of the run length decoder on data lines 59. At the output of the decoder, the matrix format data or the decoded run length data appears on lines 60. The line address data from register 34 passes through the run length converter and the run length decoder and is present on lines 61. Thus, lines 60 carry the video information for each character, and lines 61 carry the address data which defines the position of the character in the scan line.

The data for the characters in each scan line is assembled in line buffers 66. Two line buffers are provided for processing data for successive lines. While the data for one line is being assembled in one buffer, the data for the previous line is read out of the other buffer. A shifter 68 serves to align the data in the line buffers in accordance with the line address of each character. Each line buffer must be of sufficient size to store all of the bits for one scan line, and in one preferred embodiment, each line buffer is 8192 bits long, organized as a 16 × 512 RAM. The buffers are cleared as they are read so that data may be input to them in a logical OR fashion merely by writing ones but not writing zeros. This permits overlays and overstrikes of characters to be generated.

The data for each successive scan line is read out of the line buffer into a shift register which serves to has been the data for presentation on an output line 71 to raster scan device 13. The flow of the data from the line buffer through the shift register is synchronized with the beam scan of the output device. For this purpose, the line sync and page sync signals from the output device are applied to the shift register and line buffers on lines 72, 73.

In the preferred embodiment, the character generator is organized as a ten level pipeline, with a suitable pipeline controller, to allow concurrent processing of data for several successive scan lines. This permits faster processing of the data and provides a band width on the order of 50 MHz, i.e. 50 million bits per second. Pipelining techniques are well-known to those familiar with the art and need not be described in detail.

The operation of the character generator can be summarized briefly at this point. It is assumed that character definition data has been preloaded into font memory 26 by the computer and that a print cycle has been initiated. The computer begins sending character specification to input buffer 28 on a demand basis. For each scan line, the character specifications are read first from active character buffer 51 and then from input buffer 28 until an end of line specifier is reached. For each character, the font memory is cycled, and the font memory contents are interpreted as run lengths, increments, or matrix specifications for the character. If the font memory output is increments, they are added to the runs for the character in the previous scan lines, as stored in the active character buffer. Thus, run length and incremental data is converted to run length form and applied to run length decoder 56. Data stored in the matrix format passes through the run length converter unchanged and bypasses the run length decoder.

At the same time that data is sent to the run length decoder, the width of the character is checked. If not enough scan lines have traversed a character to display all of it, the width parameter and font address are updated, and the character specification is returned to the active character buffer. With characters which are stored in the RLI format, the lengths of theruns in the previous scan line are also stored in the active character bufer. When an entire character has been generated, its specification is discarded.

After the data for each character is decoded, it is shifted and loaded into one of the line buffers in accordance with the line address of the character. Following composition in the line buffer, the data for each scan line is serialized in shift register 69 and presented to the raster scan device in synchronization with the line sync signals from that device.

In addition to the height, width, RLI/matrix code, and font address parameters discussed above, each character also has an alignment parameter and a space parameter which are utilized in defining the position of the character on the page. The relationship among the width, height, alignment and space parameters can best be understood with reference to FIG. 7 in which these parameters are illustrated in conjunction with a letter A. The height and width parameters are the dimensions of the smallest rectangle containing the body of the character. By storing only the data for the portions of the character within this rectangle, a substantial saving of storage space is effected. The space parameter defines the number of scan lines from the beginning of one character to the beginning of the next, and a full or partial overstrike of characters can be effected by making the space less than the width of the first character. The alignment specifies the distance from the text base line to the lowest point in the body of the character. This parameter can be either a positive or a negative number, and it permits proper positioning of subscripts, superscripts, characters having descenders, and other characters which are displaced from the normal text lines.

The character generator is not limited to any particular software configuration, and one suitable program is described below by way of example. This program is written for a Nova 800 computer, and it performs a sort algorithm which converts a display list organized by text lines into a display list organized by scan lines for printing in portrait format.

Four arrays of data are utilized in the sort algorithm: a scan line array, a text line array, a font specification array, and a display list organized by text line. For each scan line, the scan line array contains one entry which points to an entry in the text line array. The text line array contains one 4-word entry for each text line. The first word serves both as an index for indicating the copies on which a particular text line is to be printed and as a chained pointer which identifies the text line entry that contains a character starting on the same scan line. The second word is a display list pointer which identifies the location in the display list array of the next character to be printed on the text line. The third word of the text line array specifies the font of the current character, and the fourth word is the text line address which specifies the location of the text line on the page.

The font specification array contains one 4-word entry for each character in the font memory. The first word contains the alignment and RLI/matrix code, the second word specifies the width and height of the character, the third word contains and the font address of the character, and the fourth word specifies the space occupied by the character.

The display list contains the text strings for one complete page, with end-of-line directives embedded therein. The entry for each character in this array contains two parts, one defining the vertical displacement of the character, the other defining the character itself. With entries of 16 bits per character, for example, bits 0–5 specify the vertical displacement and bits 6–15 identify one of 1024 characters.

The arrays are initialized as follows. The first entry of the scan line array is initialized to point to the first entry of the text line array. The remainder of the scan line array is initialized to zero, with the exception of the last entry which is initially made less than zero. The display list pointer in the text line array is initialized to point to the first character in each text line. The chain pointer for each text line is initialized to point to the corresponding pointer for the next text line, with the pointer for the last text line being set to zero.

The program for the Nova 800 computer is listed below with SL and FS designating the scan line and font specification arrays, respectively:

| | | |
|---|---|---|
| SL | Autoincrement address initialized to start of scan line pointer table - 1. | |
| FS | Pointer to beginning of FS (pointer on page one of core) | |
| MASK | $1777_8$ on page one of core. | |
| AC2 | Current TL address. | |
| AC3 | Current FS address. | |
| Entry Address | = START | |
| NEXTCHAR: | LDA 1,00,2 | pick up display list entry |
| | ISZ 0,2 | bump display list pointer |
| | LDA 0,MASK | load character code mask |
| | AND 1,0 | AC0=character code |
| | SUBS 0,1 | AC1-displacement*4 |
| | ADDZL 0,0 | AC0=character code *4 |
| | LDA 3,FS | base address of FS |
| | ADD 0,3 | AC3=current address in FS |
| | LDA 0,0,3 | AC0=alignment*4 |
| | ADDOL 1,0,SZC | shift in *end of line |
| | JMP SPECIAL | special character |
| | LDA 1,1,2 | text line location *8 |
| | ADD 1,0 | text line address plus directives |
| | SKPBZ FIFO | test for full buffer |
| | JMP .−1 | wait |
| | DOA 0,FIFO | output |
| | LDA 0,1,3 | width and height |
| | DOB 0,FIFO | output |
| | LDA 0,2,3 | font address |
| | DOC 0,FIFO | output |

-continued

```
           LDA 3,3,3            character space
SPACE:     LDA 0,SL             current scan line pointer
           ADDZ 0,3,SZC         check for overlay
           JMP NEXTCHAR         overlay
           LDA 0,2,2            address of next TL
           LDA 1,0,3            start address of new chain
           STA 1,2,2            splice chain
           STA 2,0,3            insert new chain entry
DELETE:    MOV 0,2,SZK          is current chain finished
           JMP NEXTCHAR         no - continue
NEXTSCAN:  SKPBZ FIFO           test for full buffer
           JMP .-1              wait
           DIA 0,FIFO           read status - end of line directive
START:     LDS 2,OSL            bump SL and load TL address
           NEGL# 2,2SZC         test for >0
           JMP NEXTCHAR         characters on this scan line
           MOV 2,2,SNR          test for 0
           JMP NEXTSCAN         try next scan line
           SUBZL 0,0            page generation complete
           ADD 0,0              AC0 = 2
           SKPBZ FIFO           test for full buffer
           JMP .-1              wait
           DOA 0,FIFO           send end of page
           SUB 0,0
           DOB 0,FIFO
           DOC 0,FIFO
           JMP RETURN           page complete
SPECIAL:   LDA 0,3,3            character space
           MOVZR 1,3
           MOVZR 3,3            AC3 = displacement
           NEGL# 0,0,SZC        test for space >0
           JMP SPACE            narrow blank
           MOVS 3,3
           MOVZR 3,3
           MOVZR 3,3            AC3 = displacement *64
           MOV 0,0,SNR          test for zero
           JMP SPACE            wide blank
           LDA 0,2,2            carriage return
           JMP DELETE
END
```

With this program, the computer provides a 48-bit data specification for each character that starts imaging on each scan line. The data for different scan lines is presented in sequential scan line order, although the specifications for the characters within a given line are not ordered by the positions of the characters within the line at this point. Each of the character specifications is transferred to input buffer 28 as a sequence of three consecutive 16-bit data transfers. As noted above, each character specification defines the font storage format, the font memory address, and the location of the character in the scan line.

The character generator treats each character specification as a 3-word string, and the structure of the words are illustrated in FIGS. 8–10. Bits 0–12 of the first word (Word 0) define the line address of the character, bit 13 is used for the RLI/matrix code, bit 14 is used as the end of page specifier, and bit 15 is used as the end of line specifier.

Bits 0–9 of the second word (Word 1) define the width of the character, and bits 10–15 of the second word and bit 0 of the third word (Word 2) define the height in 8-bit bytes. Bits 1–15 of the third word define the address of the character in the font memory.

For the first scan line of each page, the data specifications from input buffer 29 are processed one at a time until an end of scan specification is received. Upon receipt of an end of scan specification, the processing halts until a line sync pulse is received from raster scan device 13, defining the scan boundary. Specifications for characters spanning multiple scans are stacked in active character buffer 51 for subsequent scan operations. For the second and subsequent scans, the line sync signal from output device 13 defines the beginning of a scan image sequence in which the specifications in the active character buffer are processed first. Retrieval of the scan specification from this buffer initiates the processing of the specification in the input buffer, and the data in the active character buffer is augmented with the specifications for new characters which begin image transformation on the current scan line. An end of page specifier received from the input buffer identifies the last input buffer reference for that page.

For character specifications with a height Y less than or equal to 4 bytes, one font memory access is sufficient to define the contribution of a character to the current scan line. In this case, the font memory address field embedded in the character specifications points to the font memory reference location. Addresses originating from the input buffer are 15-bit words which address the font memory at even byte boundaries, whereas addresses embedded in active character buffer specifications are 16-bit byte addresses. For character specifications with a height Y greater than 4 bytes, multiple font memory accesses are required to extract the total contribution of a character to a scan line.

Since the width, or X dimension, of the character specification defines the number of scan line image sequences required to image a character, each character specification cycles through the active character buffer X-1 times. The Y dimensions, line address and RLI/matrix code of the character specification remain constant for a given character. The font memory address and the X dimension stored in the active character buffer are active variables which are modified on each scan to establish their values for the next scan image sequence.

The character generator has a number of important features and advantages. It can generate complex pages of graphic characters with a speed and electronic resolution that exceed the speed and resolution of existing xerographic machines. This character generator can produce a video output in excess of 50 million bits per second, with more than 500 scan lines per inch and up to 8192 dots per scan line. It can generate pages in either portrait or landscape format, with characters which are proportionately spaced and of arbitrary size. Multiple character overstrikes and overlapping text lines are possible, and characters can be displaced on an individual basis for superscripts and subscripts. The font memory can store up to 1024 characters, and the generator can produce up to 512 active characters per scan line and more than 20 thousand characters per page.

It is apparent from the foregoing that a new and improved character generator has been provided. While only the one presently preferred embodiment has been described, as will be apparent to those familiar with the art, certain changes and modifications can be made without departing from the scope of the invention as defined by the following claims.

What is claimed is:

1. In apparatus for generating characters to be imaged on an output device scanned in raster fashion along successive lines:
   first memory means for storing for each scan line specification data only for those characters whose first appearance occurs on that scan line,
   second memory means for storing for each scan line specification data only for those characters whose first appearance occurred on a previous scan line and which require additional scan lines to complete,
   means for accessing the first and second memory means to obtain the specification data for the characters appearing in each successive scan line,
   a font memory for storing image defining data bits for a plurality of characters arranged in individually addressable bit sequences each representing a portion of a character to be imaged in one scan line on the output device,
   means for addressing the bit sequences in the font memory in accordance with the character specification data accessed for each successive scan line, and
   means for presenting output data to the output device in accordance with the bit sequences addressed for each successive scan line.

2. The character generating apparatus of claim 1 wherein the first memory means comprises an input buffer memory for receiving the character specification data at a rate substantially independent of the rate at which the output data is presented to the output device.

3. The character generating apparatus of claim 1 wherein the character specification data stored in the second memory means includes the number of scans required to complete each character and the address in the font memory of the bit sequence representing the portion of the character to be imaged in the next scan line.

4. The character generating apparatus of claim 1 wherein the data bits for different characters are arranged in different storage formats in the font memory and the means for presenting output data includes means for decoding the data bits according to the format in which they are stored.

5. The character generating apparatus of claim 1 wherein the means for presenting output data includes first and second output buffers for receiving and presenting output data for alternate scan lines.

6. In apparatus for generating characters to be imaged on an output device scanned in raster fashion along successive scan lines:
   a font memory for storing image defining data bits for a plurality of characters arranged in individually addressable bit sequences each representing a portion of a character to be imaged in one scan line on the output device,
   an input buffer memory for storing for each scan line specification data only for those characters whose first appearance occurs on that scan line, the data for each character including a line address defining the position of the character in the scan line, a font memory address defining the location of the initial bit sequence for the character in the font memory, and formatting data including the number of scan lines required to form an image of the character,
   an active character buffer memory for storing for each scan line specification data only for those characters which have been partly imaged,
   means for accessing the buffer memories to obtain the specification data for each new character and each partly imaged character appearing in each successive scan line,
   means for updating the specification data in the character buffer memory to include for each character appearing in a current scan line the font address of the bit sequence of the portion of the character to be imaged in the next scan line and the number of scan lines required to complete the image of the character,
   means for addressing the bit sequences in the font memory in accordance with the font address for each new character and each partly imaged character in each successive scan line, and
   output buffer means for presenting output data to the output device in accordance with the bit sequences addressed for each successive scan line.

7. The character generating apparatus of claim 6, wherein timing signals are generated by the output device, and wherein the output buffer means presents output data to the output device in synchronization with said timing signals.

8. The character generating apparatus of claim 6 wherein the data for each line in the active character buffer memory is accessed prior to the data for the same line in the input buffer memory.

9. The character generating apparatus of claim 6 wherein the data bits for different characters are arranged in different storage formats in the font memory and means is included for decoding the data bits according to the format in which they are stored.

10. The character generating apparatus of claim 6 wherein the output buffer means includes first and second line buffers for storing data for alternate scan lines.

11. In a system for producing images of characters in ordered rows on an image forming device scanned in raster fashion along successive lines:
   a source of input data listing the characters in an order corresponding to the ordered rows, means for sorting the input data to present specifications for the characters in a scan line format in which the specifications are ordered according to the successive scan lines in which the images of the characters begin,
   input buffer means for storing in the scan line format and for each scan line the specifications only for those characters whose first appearance occurs on that scan line,
   active character buffer means for storing for each scan line specifications only for those characters whose first instance occurred on a previous scan line and which require additional scan lines to complete, means for accessing the input and active character buffer means to obtain the specifications for all of the characters appearing in each successive scan line, font memory means for storing image defining data bits for a plurality of characters arranged in individually addressable bit sequences each representing a portion of a character to be imaged in one scan line, means for updating the character specifications in the active character buffer means to specify the number of scan lines required to complete the image of each character and to specify the font memory address of the bit sequence of the portion of the character to be imaged in the next successive scan line, means for addressing the bit sequences in the font memory means according to the character specifications accessed for each scan line, and means for presenting output data to the image forming device in accordance with the addressed bit sequences for each successive scan line.

12. The system of claim 11 wherein the data presented to the input buffer means for each character includes a line address defining the position of the character in the scan line, a font address defining the location of the initial bit sequence for the character, and formatting data including the number of scan lines required to form the image of the character.

13. The system of claim 11 wherein the character specifications in the active character buffer means are accessed prior to the character specifications in the input buffer during each successive line.

14. The system of claim 11 wherein the data bits for different characters are stored in different formats in the font memory means.

15. The system of claim 11 wherein the means for presenting output data includes first and second line buffers for processing data for alternate scan lines.

16. The system of claim 15, wherein timing signals are generated by the image forming device, and wherein the line buffers present the output data to the image forming device in synchronization with said timing signals.

* * * * *